United States Patent [19]

Kim

[11] 4,306,946
[45] Dec. 22, 1981

[54] PROCESS FOR ACID RECOVERY FROM WASTE WATER

[75] Inventor: Bang M. Kim, Schenectady, N.Y.

[73] Assignee: General Electric Company, Schenectady, N.Y.

[21] Appl. No.: 178,735

[22] Filed: Aug. 18, 1980

[51] Int. Cl.³ .............................................. C25D 21/18
[52] U.S. Cl. ...................................... 204/51; 204/130; 204/151; 204/180 P; 204/DIG. 13; 210/644
[58] Field of Search .............. 204/51, 130, 151, 180 P; 210/22 C, 641, 89

[56] References Cited

U.S. PATENT DOCUMENTS

| | | | |
|---|---|---|---|
| 3,454,490 | 7/1969 | Wallace | 210/22 |
| 3,761,369 | 9/1973 | Tirrell | 204/151 |
| 3,764,503 | 10/1973 | Lancy et al. | 204/151 X |
| 3,909,381 | 9/1975 | Ehrsam | 204/151 X |
| 4,118,295 | 10/1978 | Korenowski et al. | 204/151 |
| 4,144,145 | 3/1979 | Watanabe et al. | 204/89 |

OTHER PUBLICATIONS

R. M. Wallace, "Concentration & Separation of Ions by Donnan Membrane", Oct. 1967, I&EC Process Design & Devel., vol. 6, No. 4, pp. 423–431.
H. M. Kelley, D. Randall, R. M. Wallace, "Metal Ion Recovery from Wastes", 1973, DuPont Innovation, pp. 4–7.
T. A. Davis, J. S. Wu, B. C. Baker, "Use of the Donnan Equilibrium Principle to Concentrate Uranyl Ions by an Ion–Exchange Membrane Process", Jul. 1971, AICHE Journ., vol. 17, No. 4, pp. 1006–1008.

Primary Examiner—Arthur C. Prescott
Attorney, Agent, or Firm—Lawrence D. Cutter; James C. Davis, Jr.; Marvin Snyder

[57] ABSTRACT

Anions such as chromate ions are removed from a stream of waste water through an anion selective membrane and are subsequently combined with hydrogen ions transferred across a cation selective membrane in a two-phase Donnan dialysis acid recovery process. In a preferred embodiment chromate ions recovered from an electroplating process rinse solution are recycled to an associated electroplating bath as chromic acid while the chromate ion-depleted rinse solution is recycled to an associated rinse tank.

11 Claims, 2 Drawing Figures

PROCESS FOR ACID RECOVERY FROM WASTE WATER

BACKGROUND OF THE INVENTION

This invention relates generally to waste water treatment processes, and more particularly, to processes for the recovery of acids from a waste water stream.

There has been a growing need to remove ions from aqueous solutions as required both for pollution control as well as for the recovery of valuable materials. Of particular interest are chromate wastes such as produced in electroplating plants, metal finishing plants, cooling towers and pigment manufacturing plants. These chromate wastes are extremely toxic and pose a potential threat to human and aquatic life. They also have a deleterious affect on biological sewage treatment processes. Additionally, it would be economically beneficial to recycle both the chromate ions and a resulting raffinate (depleted feed solution) to an initiating process.

Chemical treatment methods have been employed for the removal of chromates from waste water. However, such methods cannot be efficiently applied directly to the treatment of a large volume of dilute chromate solution. Similarly, the operating costs of electrochemical waste water treatment processes is significantly effected by the concentration of the pollutant to be treated. Accordingly, it is often necessary to increase the concentration of ions to be removed and to correspondingly reduce the volume of waste water to be treated so as to facilitate such removal processes.

Ion exchange processes have also been utilized for the removal and concentration of anions such as chromate ions. However, these processes are typically operated in a batch mode and require complex flow controls schemes. Moreover, both chemical and ion exchange treatments typically incur relatively high operating costs necessitated by the replacement of chemical and resin feedstocks, respectively. Similarly, electrochemical processes require an input of electrical energy which is becoming increasingly more expensive.

Accordingly, it is an object of the present invention to provide a new and improved process for removing anions from a waste water stream.

It is another object of the present invention to provide a waste water treatment process in which both treated aqueous solutions and acid solutions containing recovered anions are beneficially produced for recycling to an associated process.

It is a further object of the present invention to provide a new and improved waste water treatment process having both low energy and chemical feedstock requirements.

It is still another object of the present invention to provide a new and improved process for efficiently removing anions from a continuous flow of a dilute solution.

SUMMARY OF THE INVENTION

The above and other objects and advantages are achieved in a process in which an anion of interest is removed from a waste stream by simultaneously passing the stream and a sweep solution containing a second anion on opposite sides of an anion selective membrane. The anion chemical potential of the sweep solution is adjusted to be greater than that of the waste stream, and the contact with the membrane is maintained for a sufficient time to effect the transfer of a substantial quantity of the anion of interest across the membrane to the sweep solution. In a preferred embodiment, the resulting anion-depleted waste stream is subsequently recycled such as to a rinse tank and an associated electroplating process. The resulting sweep solution is then acidified by providing an acidic solution having a greater cationic chemical potential greater than the resulting sweep solution and by simultaneously passing these two solutions in contact with opposite sides of a cationic selective membrane. This contact is maintained for a sufficient time to effect the transfer of a quantity of hydrogen ions across the membrane, thereby transforming the resulting sweep solution into an acidic product solution which is preferably recycled such as to an electroplating bath in a preferred embodiment of this invention in which chromic acid is recovered.

BRIEF DESCRIPTION OF THE DRAWING

For a better understanding of the invention, reference may be had to the accompanying drawing wherein.

DESCRIPTION OF THE INVENTION

Figure 1:
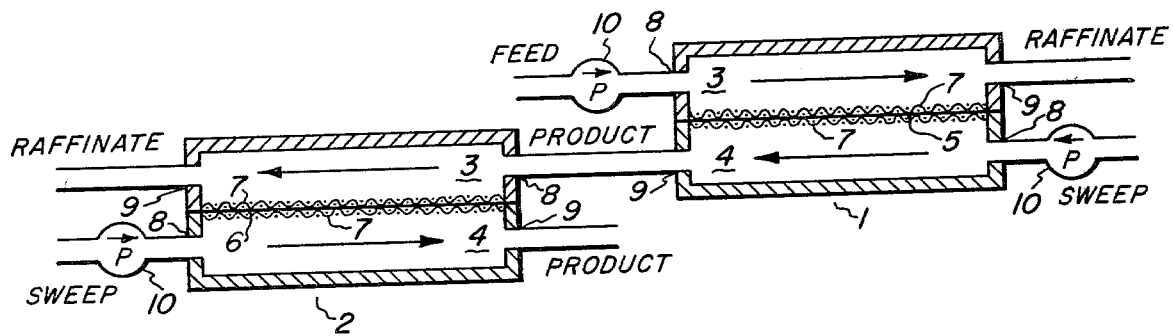
FIG. 1 is a schematic representation of an acid recovery process according to the present invention.

The present invention utilizes Donnan dialysis to remove anions such as chromate ions from a waste water stream, and to then acidify the removed anions to form an acid such as chromic acid. In the past Donnan dialysis has been primarily applied to the recovery of cations, and has only had limited application to anion transfer. The basic principles of Donnan dialysis are described in U.S. Pat. No. 3,454,490 (Wallace) which is incorporated herein by reference. In Donnan dialysis two electrolyte solutions referred to as a sweep solution and a feed solution are separated by an ion selective membrane which is a semi-permeable membrane that preferentially transfers ions of a particular polarity. Initially, the sweep solution contains a high concentration of an ion species while the feed solution contains a relatively low concentration of a second ion species having the same polarity as the sweep solution ion. Since only the ions of a given polarity are permeable to the membrane, the sweep and feed ion species counter-diffuse across the membrane until an equilibrium is established. The equilibrium relationship of ions between the feed and sweep solutions is characterized by:

$$\left(\frac{C_{x1}}{C_{x2}}\right)^{Z_y} = \left(\frac{C_{y1}}{C_{y2}}\right)^{Z_x}$$

where $G_{ij}$ is the concentration of ion i in a solution j, and $Z_i$ is the valance of the ion i.

From this equilibrium relationship it can be appreciated that the resulting sweep solution will contain a concentration of the feed solution ion species which is higher than that present in the resulting raffinate (depleted feed solution). It can also be appreciated that polyvalent ions will be preferentially concentrated due to the effect of the exponential on the equilibrium relationship. Thus, the present invention is particularly efficient in removing polyvalent anions such as $PO_4^{3-}$, $HPO_4^{2-}$, $P_2O_7^{4-}$, $A_sO_4^{3-}$ as well as $CrO_4^{2-}$ from a waste stream. $CN^{31}$ is an additional anion of interest, due to its high toxicity and presence in streams such as that from the electroplating process. However, one negative aspect of using Donnan dialysis for treatment of cynanide wastes is that the process is not selective of $CN^-$ in the presence of other polyvalent anions due to the exponential factor noted above. For purposes of this description chromate will be used as an example, however, it is understood that waste streams containing other anions may also be treated according to the present process.

The apparatus required for the present process includes membrane assemblies 1 and 2. These assemblies may be of a variety of configurations including those described in the Wallace patent incorporated herein by reference. Each assembly includes a feed solution compartment 3 and a sweep solution compartment 4 positioned on opposite sides of a membrane. Of course, multi-compartment membrane assemblies as described by Wallace may also be used and indeed are preferred since they enable an increased flow rate as compared to a single compartment assembly.

The membranes employed in the assemblies 1 and 2 consist of suitable ion selective material having a polar selective permeability for the ionic species to be concentrated. Accordingly, the feed and sweep solution compartments in membrane assembly 1 are separated by an anion selective membrane 5, while the compartments of assembly 2 are separated by a cation selective membrane 6. Suitable anion selective membranes include the Ionac MA 3148 and MA 3475 membranes available from the Ionac Chemical Company. Suitable cation selective membranes include the Ionac MC 3142 and MC 3470 membranes also available from the Ionac Chemical Company. Membrane selection for a specific application depends upon several variables. For example, because of its chemical stability in basic solutions, the Ionac MA 3475 membrane is preferentially employed over the —MA 3148 membrane when $OH^-$ negative ions are employed in the sweep solution. Similarly, thinner membranes tend to support greater ionic fluxes therethrough.

In the embodiment depicted in FIG. 1, the membranes 5 and 6 are supported by screens 7. Polyester screen with 2,000-micron openings may be employed for this function. Suitable inlet manifolds 8, outlet manifolds 9 and pumps 10 are connected in flow communication with the feed and sweep solution compartments 3 and 4 to enable the required solutions to flow therethrough.

The feed solution entering the compartment 3 of membrane assembly 1 includes the anion of interest which is to be removed from the feed stream. Pretreatment of the feed solution may be necessary before entering the dialysis system. For example, chromate solutions at low pH have high oxidizing power and may eventually destroy the membrane 5. Accordingly, the adjustment of the pH to a more neutral condition is required for such a case. For cynanide-containing feed solutions, an increase in $CN^-$ dissociation is encountered as pH increases. Accordingly, the adjustment of the feed solution to a higher pH may be advantageous to increase the free $CN^{31}$ content.

The sweep solution entering the compartment 4 of membrane assembly 1 must include an anionic radical different than the anion of interest contained in the feed solution. $Cl^-$, $OH^{31}$, and other monovalent anions are suggested for use in such a sweep solution. The choice among these ions depends upon the condition of the waste water, the followup treatment process, and economics of the particular application. $Cl^-$ is preferred since it is easily available from NaCl at low cost, is simple to use, and is relatively inert to membranes and other ions. However, the hydroxide ion is advantageously used when it is desirable to increase the pH of the feed solution as the hydroxide diffuses into the feed compartment 3. Thus, the hydroxide ion could be advantageously employed in the sweep solution to assist in the dissociation of NaCN in a feed solution as noted above. However, high hydroxide concentration reduces the lifetime of a cooperating membrane.

The sweep solution flowed through the compartment 4 of the membrane assembly 2 is an acidic solution of a greater/cationic chemical potential than that of the solution in the adjoining compartment 3 so as to enable a suitable Donnan dialysis process. This sweep solution may, for example, include HCl or $H_2SO_4$.

Figure 2:
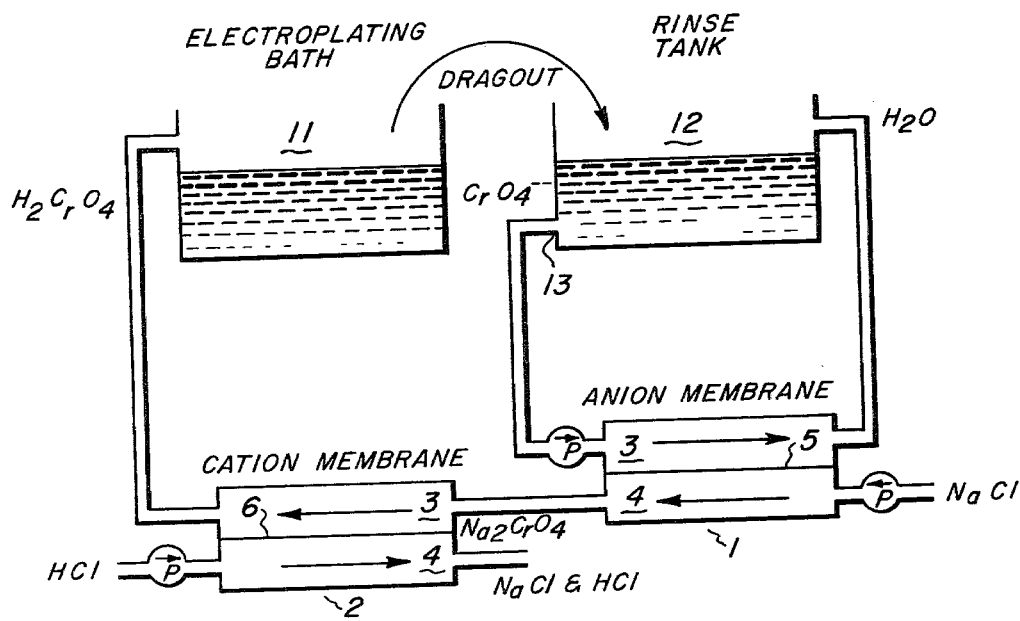
FIG. 2 is a schematic representation of an electroplating process in which chromate ions are recovered and recycled as chromic acid according to an embodiment of the present invention.

The operation of the present invention is best described in conjunction with the exemplitive embodiment depicted in FIG. 2. This embodiment includes an electroplating process with chromic acid recovery. In a typical electroplating process an object to be coated is first submerged in an electroplating bath 11 which includes chromic acid ($H_2CrO_4$). After a sufficient period of time in the bath 11, the plated object is removed to a rinse tank 12 where excess surface material is removed. A portion of the electroplating solution accompanies the object to the rinse tank and is known as "dragout". This dragout includes a portion of the chromate from the electroplating bath. Thus, over a period of time the electroplating bath is depleted of chromic acid, while the rinse tank fluid is polluted with chromate ions.

Accordingly, rinse solution including $CrO_4^{2-}$ is removed from the rinse tank 12 at a point 13 and is passed through the feed solution compartment 3 of the membrane assembly 1. Simultaneously, a sweep solution including NaCl is passed through the sweep solution compartment 4 of the assembly 1 and placed in contact on the opposite side of the ion selective membrane 5. The flow rates of the rinse solution and the sweep solution are adjusted to maintain solution contact with the membrane 5 for time sufficient to effect the transfer of chromate ions across the membrane into the sweep solution. Tests indicate that the ion flux across the membrane will increase as the flow rate of the sweep solution is increased.

In the illustrated embodiment raffinate from the compartment 3 of the membrane assembly 1 is beneficially returned to the rinse tank 12 as a supply of makeup water. In this manner, the problems of raffinate disposal and rinse tank water makeup are resolved.

The resulting sweep solution exhausted from the membrane assembly 1 contains $Na_2CrO_4$. This solution is then passed through the feed solution compartment 3 of the second membrane assembly 2. An acidic solution is simultaneously passed through the sweep solution compartment 4 of the assembly 2 in contact with the cation selective membrane 6. A difference in the cationic chemical potential is maintained between the acidic solution and the resulting sweep solution contacting the membrane 6. Thus, through a Donnan dialysis process, hydrogen ions from the acidic solution are transferred across to the resulting sweep solution to form a product solution of chromic acid ($H_2CrO_4$). This chromic acid is beneficially returned to the electroplating bath 11 to complete an efficient recycling process.

Accordingly, in the practice of the present invention chromic acid may be recovered for reuse in an electroplating process. Similarly, chromate ions may be removed from the fluid in an associated rinse tank while makeup fluid is provided by the resulting raffinate. The present invention requires little energy or chemical feedstock input and typically operates on a continuous basis. Moreover, the present process is effective in removing anions from dilute waste water streams. For example, tests demonstrate a 99.8% chromate ion removal rate from an initial 0.1 mole per liter feed solution of $Na_2CrO_4$ into an initial 1 mole per liter NaCl sweep solution.

The above described embodiments of this invention are intended to be exemplitive only and not limiting, and it will be appreciated from the foregoing by those skilled in the art that many substitutions, alterations and changes may be made to the disclosed process without departing from the spirit or the scope of the invention.

What is claimed as new and desired to be secured by Letters Patent of the United States is:

1. A plating process in which a first anionic radical is removed from a plating solution to a rinse solution during the transfer of an object from a plating bath to a rinse tank, and in which the first anionic radical is recycled to the plating solution by:

passing rinse solution containing the first anionic radical in contact with a first side of an anion selective membrane;

simultaneously passing a sweep solution containing a second anionic radical and having a greater anionic radical chemical potential than the rinse solution in contact with an opposite side of the membrane;

maintaining the rinse and sweep solutions in contact with the anion selective membrane for sufficient time to effect the transfer of a quantity of the first anionic radical across the membrane from the rinse solution to the sweep solution;

removing the resulting rinse solution from contact with the membrane; and passing the resulting sweep solution containing the first anionic radical to the plating bath.

2. A process as in claim 1 in which the resulting sweep solution containing the first anionic radical is acidified before being passed to the plating bath by:

passing the resulting sweep solution in contact with a first side of a cation selective membrane;

simultaneously passing an acidic sweep solution having a greater cationic radical chemical potential than the resulting sweep solution in contact with an opposite side of the cation selective membrane;

maintaining the resulting and acidic sweep solutions in contact with the cation selective membrane for sufficient time to effect the transfer of a quantity of hydrogen ions across the membrane to the resulting sweep solution, thereby transforming the resulting sweep solution into an acidic product solution containing the first anionic radical; and passing the product solution to the plating bath.

3. A process as in claim 1 in which the resulting rinse solution is removed from contact with the anion selective membrane and is recycled to the rinse tank.

4. A process as in claim 1 or 4 in which the first anionic radical is $CrO_4^{--}$.

5. A process as in claim 1 in which the first anionic radical is selected from the group comprising $CrO_4^{2-}$, $PO_4^{3-}$, $HPO_4^{2-}$, $P_2O_7^{4-}$, $A_sO_4^{3-}$, and $CN^-$.

6. A arocess as in claim 1 in which the second ionic radical is $Cl^-$.

7. A process as in claim 1 in which the second ionic radical is $OH^-$.

8. A process as in claim 2 in which the acidic sweep solution includes $H_2SO_4$.

9. A process as in claim 4 in which the acidic sweep solution includes HCl.

10. A process for recovering an acid from a feed solution containing the anionic radical of said acid and comprising the steps of:

passing the feed solution in contact with a first side of an anion selective membrane;

simultaneously passing a sweep solution containing a second anionic radical and having a greater anionic radical chemical potential than the waste stream in contact with an opposite side of the anion selective membrane;

maintaining the feed and sweep solutions in contact with the anion selective membrane for sufficient time to effect the transfer of a substantial quantity of the feed solution anionic radical across the membrane to the sweep solution;

passing the resulting sweep solution containing the transferred anionic radical in contact with a first side of a cationic selective membrane;

simultaneously passing an acidic solution having a greater cationic radical chemical potential than the resulting sweep solution in contact with the opposite side of the cationic selective membrane;

maintaining the resulting and acidic sweep solution in contact with the cation selective membrane for sufficient time to effect the transfer of a quantity of hydrogen ions across the membrane, thereby transforming the resulting sweep solution into an acidic product solution; and removing the acidic product solution from contact with the membrane.

11. A process as in claim 10 in which the anionic radical contained in the waste stream is taken from the group comprising $CrO_4^{2-}$, $CN^-$, $PO_4^{3-}$, $HPO_4^{2-}$, and $P_2O_7^{4-}$ and $A_sO_4^{3-}$.

* * * * *

UNITED STATES PATENT AND TRADEMARK OFFICE
CERTIFICATE OF CORRECTION

PATENT NO. : 4,306,946

DATED : December 22, 1981

INVENTOR(S) : Bang Mo Kim

It is certified that error appears in the above-identified patent and that said Letters Patent is hereby corrected as shown below:

Column 2, line 58, delete "$G_{ij}$" and substitute therefor -- $C_{ij}$ --.

Signed and Sealed this

First Day of March 1983

[SEAL]

Attest:

GERALD J. MOSSINGHOFF

Attesting Officer

Commissioner of Patents and Trademarks